(12) United States Patent
Hughes

(10) Patent No.: US 7,946,601 B2
(45) Date of Patent: May 24, 2011

(54) SUSPENSION TRAILING ARM

(75) Inventor: Thomas Hughes, Cheshire (GB)

(73) Assignee: Meritor Heavy Vehicle Systems Limited, Clwyd (GB)

( * ) Notice: Subject to any disclaimer, the term of this patent is extended or adjusted under 35 U.S.C. 154(b) by 1813 days.

(21) Appl. No.: 10/867,561

(22) Filed: Jun. 14, 2004

(65) Prior Publication Data

US 2005/0006869 A1     Jan. 13, 2005

(30) Foreign Application Priority Data

Jun. 14, 2003 (GB) ................................. 0313804.7

(51) Int. Cl.
*B60G 3/12* (2006.01)
(52) U.S. Cl. ............................................... 280/124.128
(58) Field of Classification Search ............ 280/124.128
See application file for complete search history.

(56) References Cited

U.S. PATENT DOCUMENTS

| | | | |
|---|---|---|---|
| 4,183,261 A | | 1/1980 | Eiselbrecher et al. |
| 6,123,349 A | * | 9/2000 | Depue ..................... 280/124.106 |
| 6,557,875 B2 | * | 5/2003 | Schlosser et al. ...... 280/124.153 |
| 6,893,733 B2 | * | 5/2005 | Obeshaw ...................... 428/593 |
| 2002/0149190 A1 | | 10/2002 | Bradley et al. |
| 2004/0256910 A1 | * | 12/2004 | Chalin et al. ................ 301/124.1 |
| 2006/0157950 A1 | * | 7/2006 | Chalin ...................... 280/124.11 |

FOREIGN PATENT DOCUMENTS

| | | |
|---|---|---|
| EP | 0 156 705 | 3/1985 |
| EP | 0 243 191 | 4/1987 |
| EP | 0 321 178 | 6/1989 |
| EP | 1 197 359 | 4/2002 |
| GB | 2 145 797 | 4/1985 |
| GB | 2 272 407 | 5/1994 |
| JP | 60076409 | 4/1985 |

OTHER PUBLICATIONS

European Search Report dated Mar. 2, 2005.

* cited by examiner

*Primary Examiner* — Faye M. Fleming
(74) *Attorney, Agent, or Firm* — Carlson, Gaskey & Olds, P.C.

(57) ABSTRACT

A composite suspension trailing arm for heavy commercial vehicles includes an axle locating portion integral with the trailing arm, a chassis mounting feature to mount the trailing arm to a chassis component of a vehicle and a spring mounting feature integral with the trailing arm. The axle locating portion is located between the chassis mounting feature and the spring mounting feature. The composite material is made of a matrix material and a reinforcement material.

1 Claim, 4 Drawing Sheets

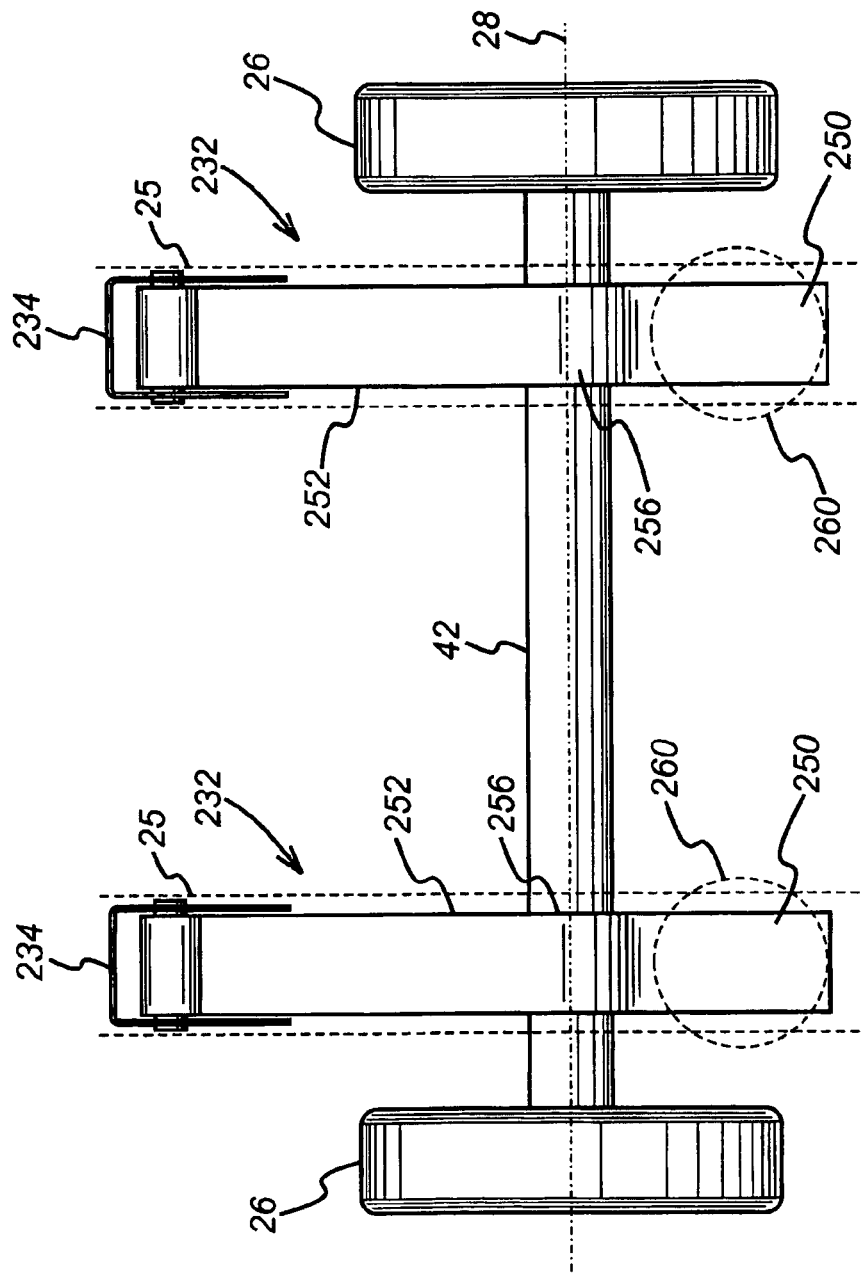

SUSPENSION TRAILING ARM

REFERENCE TO RELATED APPLICATION

This application claims priority to Great Britain Patent Application GB 0313804.7 filed on Jun. 14, 2003.

BACKGROUND OF THE INVENTION

The present invention relates to a suspension trailing arm, and in particular to a composite suspension trailing arm for a heavy commercial vehicle.

Heavy commercial vehicles typically employ trailing arm suspension systems, particularly in relation to the rear axles of rigid body vehicles or the axles of trailers of articulated vehicles.

Heavy commercial vehicles (including trucks, buses and coaches) can be distinguished from light commercial vehicles (such as vans) and light passenger vehicles due to one or more of the following characteristics: 1) a laden weight in excess of approximately 3.5 tons, and 2) the use air actuated brakes as opposed to hydraulically actuated brakes (because air actuated brakes are better able to withstand the increased heat generated by the repeated braking of a vehicle having a weight greater than approximately 3.5 tons).

Such vehicles (including trailers) also typically employ a pair of spaced parallel beams that extend the length of the vehicle and act as a chassis upon which the vehicle body is mounted.

When used in heavy commercial vehicles, the front of the trailing arms are typically pivotally mounted to the chassis beams of the vehicle. Each of the trailing arms extend rearwardly (i.e., towards the rear of the vehicle) to a mounting position for the axle and then further rearwardly to a mounting surface for an air spring that is mounted between the trailing arm and the vehicle chassis. Axles in these vehicles are typically substantially rigid beam-type axles. In some circumstances, the orientation of the trailing arms may be reversed to pivot at the rear of each of the trailing arms, in which case they are known as "leading arms." For the purposes of this specification, the term trailing arm should also be understood to encompass leading arms.

Known heavy vehicle trailing arms are typically constructed either from solid spring steel trailing arms provided with U-bolts and plates that connect the axle to the trailing arm, fabricated steel plate which is then welded to an axle or axle adapter, or a hybrid of these two types of trailing arms. One such fabricated trailing arm is disclosed in U.S. Pat. No. 5,639,110 issued to Pierce et al.

Both prior art types of trailing arms provide a rigid connection between the trailing arm and the axle to resist bending, but have a resilient connection between the chassis and the axle. The resilient connection is provided either by the flexing of the spring steel trailing arm or by the flexing of a large elastomeric bushing (resilient bearing) located in the end of the fabricated trailing arm between the chassis and the trailing arm. This enables articulation forces induced during vehicle use to be taken up, while maintaining tracking and roll stability. For fabricated trailing arms for use in heavy commercial vehicles, it has typically been necessary for the traveling arms to be manufactured having a closed box-section profile to impart sufficient tracking stability to the trailing arm.

One disadvantage of known manufacturing techniques is that the shape of the trailing arm is restricted, which in turn restricts the positioning of additional components that are mounted to the trailing arms, such as brakes, air springs, dampers and pivot bushings. This may cause the suspension packaging (i.e., its space requirement) to be inefficient. Another disadvantage of known trailing arms is that it is timely to secure the trailing arm to the axle, for example, by fastening or welding.

The desire to reduce the weight of vehicle components means it also desirable to provide a trailing arm of reduced weight which provides comparable flexibility to known spring steel trailing arms.

SUMMARY OF THE INVENTION

An object of the present invention is to provide an improved trailing arm.

The present invention provides a composite suspension trailing arm for heavy commercial vehicles including an axle locating portion integral with the trailing arm, a chassis mounting feature to mount the trailing arm to a chassis component of a vehicle and a spring mounting feature integral with the trailing arm. The axle locating portion is located between the chassis mounting feature and the spring mounting feature.

Preferably, this reduces the weight of the trailing arm, which may provide additional benefits for the fuel consumption or load capacity of a vehicle to which the trailing arm is fitted.

Furthermore, composite manufacturing techniques allow the shape of the trailing arm to be tailored to meet the packaging requirements of the additional components mounted to and around the trailing arm. The same manufacturing techniques also allow the properties of the trailing arm to be locally tailored by varying the composition of the composite material used. Therefore, for example, a known potential failure point can be reinforced by using a composite material of appropriate composition. Additionally, composites do not suffer from the same corrosion problems associated with steel components.

According to a further aspect of the present invention, a heavy vehicle suspension assembly includes first and second composite trailing arms arranged in a spaced substantially parallel alignment and a beam-type axle rigidly secured to and extending between the first and second composite trailer arms.

The present invention also provides a method of making a trailing arm for heavy commercial vehicles including the steps of providing a matrix material, providing a reinforcement material, arranging the matrix material and the reinforcement material to form a matrix reinforcement composition, and then curing the matrix reinforcement composition to form the trailing arm.

BRIEF DESCRIPTION OF DRAWINGS

The invention will now be described, by way of example only, with reference to the accompanying drawings, in which:

FIG. 6 schematically illustrates a plan view of a suspension assembly incorporating two trailing arms according to the present invention.

DETAILED DESCRIPTION OF THE PREFERRED EMBODIMENT

Figure 1:
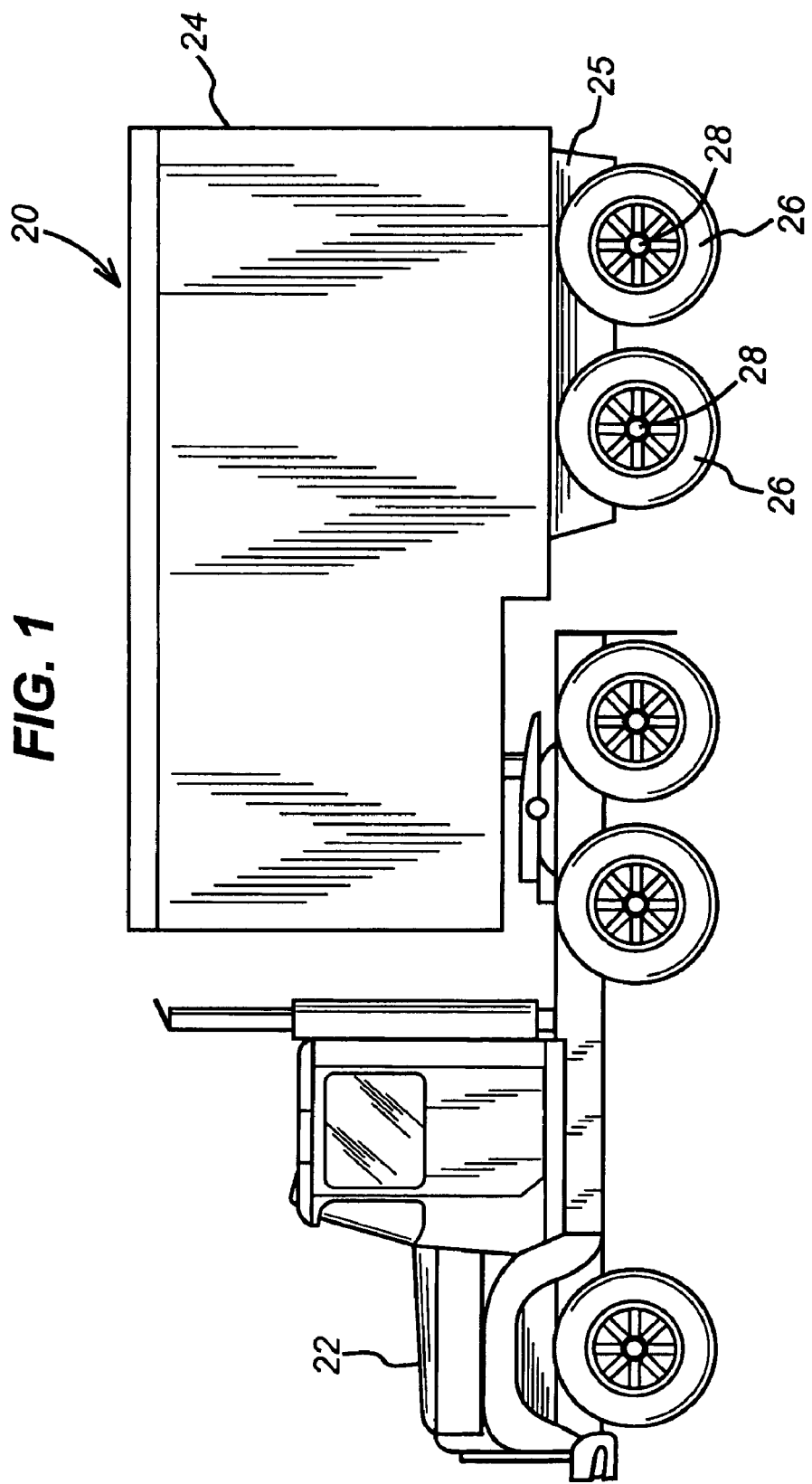
FIG. 1 schematically illustrates a side view of a typical heavy commercial vehicle.

FIG. 1 illustrates a heavy commercial vehicle 20 including a tractor portion 22 and a trailer portion 24 mounted for articulation relative to the tractor portion 22. A plurality of wheels 26 are suspended from a chassis 25 of the trailer portion 24 and each rotate about an axis 28.

Figure 2:
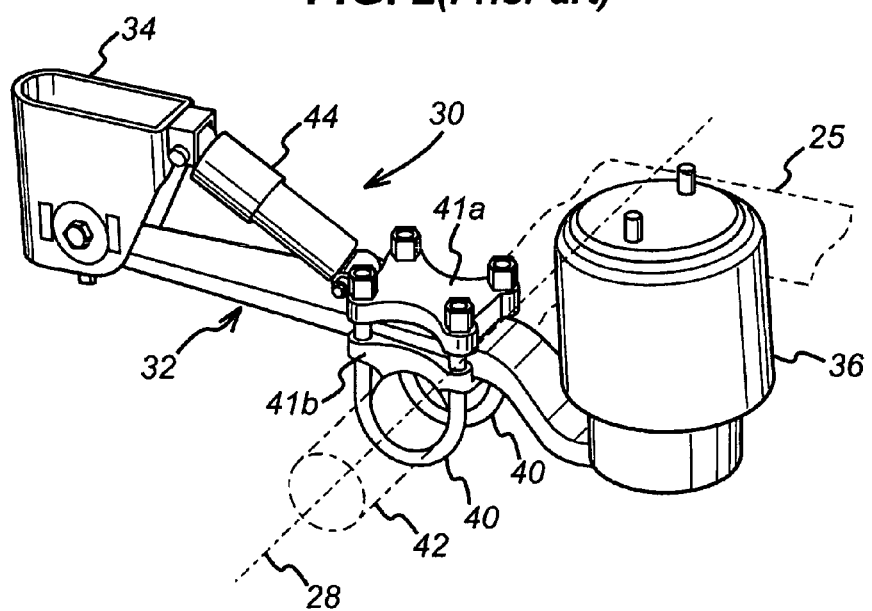
FIG. 2 schematically illustrates a perspective view of a prior art suspension assembly.

FIG. 2 shows a prior art suspension assembly 30 which includes a spring steel suspension trailing arm 32, a chassis support bracket 34 and an air spring 36. The chassis support bracket 34 and the air spring 36 provide a connection with, and suspension relative to, a trailer chassis 25 (shown in broken lines for clarity) in a known manner. U-bolts 40 and top and bottom plates 41a and 41b, respectively, mount an axle 42 (shown in broken lines for clarity) to the trailing arm 32. In particular, the bottom plate 41b is welded directly to axle 42. Wheels (not shown) are secured to each end of the axle 42 and rotate about the axis 28. A damper 44 mounted between the chassis support bracket 34 and the U-bolt 40 and the plates 41a and 41b damps oscillations of the axle 42 relative to the chassis 25 as the vehicle 20 drives over an uneven surface.

Figure 3:
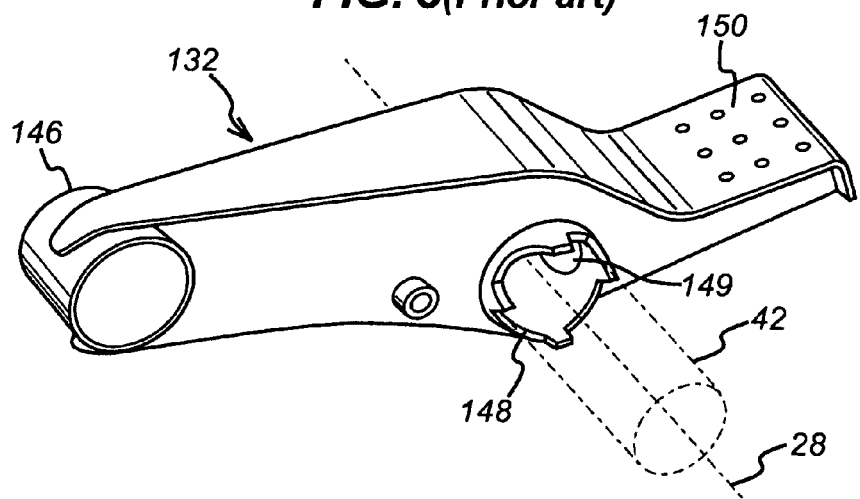
FIG. 3 schematically illustrates a perspective view of another prior art suspension assembly.

A fabricated steel trailing arm 132 of a prior art design is shown in FIG. 3. The trailing arm 132 includes a bushing 146 housing a resilient bearing (not shown) that enables the trailing arm 132 to be mounted to a chassis support bracket and an integrated axle wrap 148 that supports the axle 42 of the vehicle 20. The axle wrap 148 is first welded to the axle 42 around the periphery of openings 149, (only one is visible in FIG. 3, but two are present on the axle wrap 148) and the remainder of the trailing arm 132 is then welded to the axle wrap 148. The trailing arm 132 further includes a surface 150 upon which an air spring (not shown) may be mounted.

It will be appreciated that for both types of prior art trailing arms described above, a considerable amount of assembly and a large number of components are required to provide a complete suspension assembly.

Figure 4:
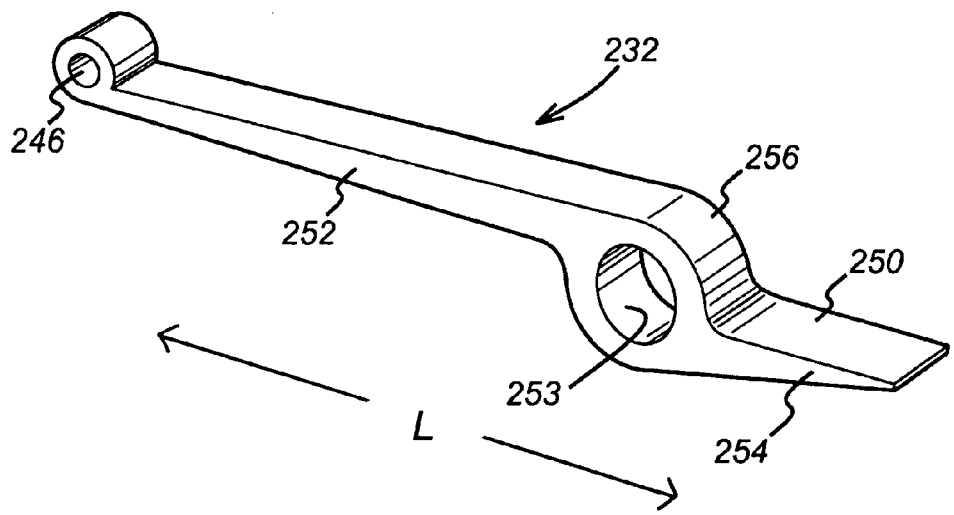
FIG. 4 schematically illustrates a perspective view of a trailing arm according to the present invention.
Figure 5:
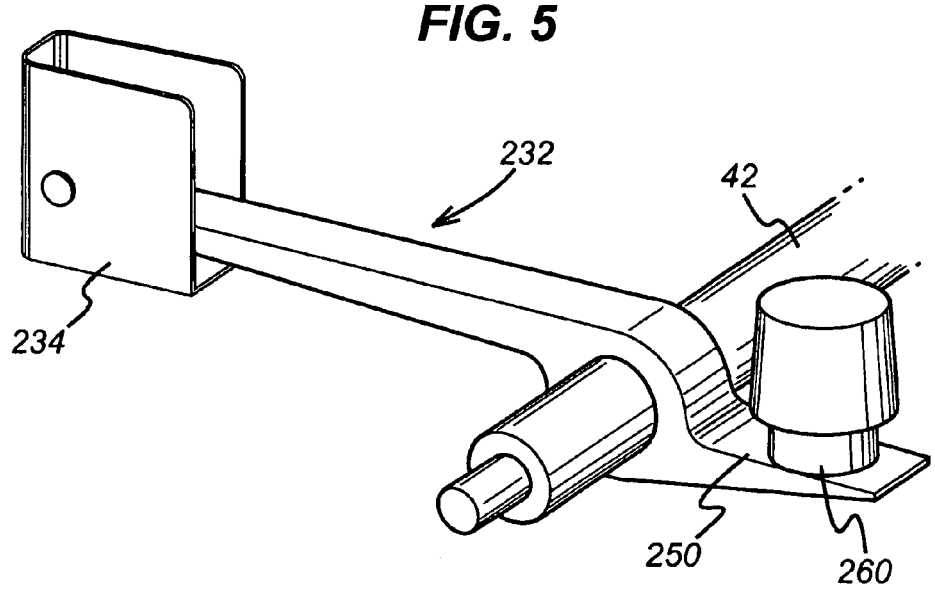
FIG. 5 schematically illustrates a perspective view of the trailing arm of FIG. 4 showing the location of suspension components.

FIG. 4 shows a trailing arm 232 according to the present invention to which a conventional axle 42 is mounted (shown in FIG. 5). Such axles 42 are typically capable of each carrying six or more tons of payload in use. The trailing arm 232 is made as a single piece from a composite material.

The trailing arm 232 has a front portion 252 and a rear portion 254 separated by an axle locating portion in the form of an axle wrap 256 dimensioned to receive the axle 42. The axle wrap 256 and the axle 42 have an oval cross-section to prevent rotation between the axle 42 and the trailing arm 232. A suitable adhesive is also applied between the inside surface 253 of the axle wrap 256 and the axle 42 to further prevent rotation between the axle 42 and the trailing arm 232. In other embodiments, a circular axle may be used, and an adhesive is employed to prevent relative rotation or lateral movement between the trailing arm 232 and the axle 42.

The leading end of the front portion 252 includes a bearing mounting 246 to receive a resilient bearing (not shown) that mounts the trailing arm 232 to a chassis support bracket 234 in a similar manner to the prior art. The chassis support bracket 234 is in turn secured to the underside of the chassis 25 (shown in broken lines in FIG. 5). In other embodiments, the connection between the chassis support bracket 234 and the trailing arm 232 may not have a resilient bearing and only requires a pivotal connection. In this case, the trailing arm 232 alone provides flexibility between the chassis 25 and the axle 42.

The rear portion 254 of the trailing arm 232 includes an upwardly facing substantially planar surface 250 upon which an air spring 260 may be received. Through holes (not shown) may also be provided on the planar surface 250 to securely locate the air spring 260 on the planar surface 250 by, for example, bolts.

The trailing arm 232 is made of a composite material including a matrix material and a reinforcement material. Suitable trailing arm materials include a matrix of epoxy resin reinforced with carbon fiber. Other suitable materials having sufficient strength and durability properties for this particular application are also possible. Combinations of reinforcing fibers can also be used to enable different compositions to be used in different areas of the trailing arm 232 according to mechanical requirements.

One suitable technique used to produce the trailing arm 232 of the present invention includes molding layers of pre-impregnated tape. The tape includes unidirectional fibers surrounded by a resin. The tape is stacked in layers and then compacted and heated to form the required shape of the trailing arm 232. The tape is stacked such that the fibers are substantially orientated in the longitudinal direction of the trailing arm 232 (indicated by arrow L).

Filament winding is another suitable technique employed to produce the trailing arm 232. A continuous strand of pre-impregnated fibers or tape is wound onto a mandrel, and the mandrel is removed after the resin is cured in an oven.

The techniques outlined above enables a trailing arm 232 to be produced with a majority of the fibers oriented in the longitudinal direction of the trailing arm 232. The thickness of the final shape of the trailing arm 232 and the section of the trailing arm 232 is determined by the strength and stiffness requirements of the trailing arm 232. In particular, the trailing arm 232 will typically require sufficient lateral strength and stiffness to resist lateral cornering loads, while having torsional compliance to allow the wheels and the axle 42 to ride over uneven terrain (depending on the characteristics of the resilient bearing).

In some embodiments, the surfaces of the trailing arm 232 are machined to provide a suitable surface finish for fitment to the axle 42 or other components. Furthermore, holes may be drilled in the trailing arm 232 to attach additional components, such as dampers, for example.

FIG. 6 illustrates a suspension assembly incorporating two trailing arms 232 mounted substantially in line with rails of the chassis 25 (shown in broken lines for clarity) and secured to the rails of the chassis 25 by support brackets 234. The beam axle 42 extends through the axle wraps 256, and a wheel 26 is mounted on each end of the beam axle 42.

It should be understood that terms such as front, rear, top and bottom as used to describe the orientation of the various components are for illustrative purposes only and should not be construed as limiting with respect of the orientation in which the trailing arm 232 may be fitted in a particular vehicle. It should be understood that the trailing arm 232 according to the present invention may also be used as leading arms in which the mounting bracket is arranged near the air spring on a vehicle.

It will further be appreciated that numerous changes may be made within the scope of the present invention. The trailing arm 232 may be adapted for use with alternatives to air springs, such as coil springs for example, and may be fitted to monocoque type chassis. Additional features may be included in the shape of the trailing arm for mounting other suspension components. The trailing arm 232 may be adapted to receive non-circular (e.g. square) axles and may mount stub as well as beam axles.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A suspension trailing arm made of a composite material for a heavy commercial vehicle, the suspension trailing arm comprising:

an axle locating portion integral with the suspension trailing arm;

a chassis mounting feature to mount the suspension trailing arm to a chassis component of a vehicle; and a spring mounting feature integral with the suspension trailing arm, wherein the axle locating portion is located between the chassis mounting feature and the spring mounting feature, the suspension trailing arm is made of a composite material, and the composite material includes a matrix material and a reinforcement material, wherein the axle locating portion and the suspension trailing arm are formed in one piece.

* * * * *